(12) United States Patent
Nader et al.

(10) Patent No.: US 8,463,261 B2
(45) Date of Patent: Jun. 11, 2013

(54) METHODS AND SYSTEMS FOR SELF-TUNING NETWORK SEARCH ALGORITHMS

(75) Inventors: Ali Nader, Malmö (SE); Jan Wichert, Malmö (SE)

(73) Assignee: ST-Ericsson SA, Plan-les-Ouates (CH)

( * ) Notice: Subject to any disclaimer, the term of this patent is extended or adjusted under 35 U.S.C. 154(b) by 8 days.

(21) Appl. No.: 13/113,252

(22) Filed: May 23, 2011

(65) Prior Publication Data

US 2012/0302221 A1 Nov. 29, 2012

(51) Int. Cl.
*H04W 4/00* (2009.01)

(52) U.S. Cl.
USPC ............ 455/434; 455/432.1; 455/435.2; 370/328

(58) Field of Classification Search
USPC .......... 455/432.1, 432.2, 432.3, 434, 435.1, 455/435.2, 435.3, 448, 449, 436–444; 370/328, 370/331, 332, 338
See application file for complete search history.

(56) References Cited

U.S. PATENT DOCUMENTS

| | | | |
|---|---|---|---|
| 6,400,961 | B1 | 6/2002 | Lillie et al. |
| 2005/0070279 | A1 | 3/2005 | Ginzburg et al. |
| 2006/0104211 | A1 | 5/2006 | Islam et al. |
| 2007/0242619 | A1 | 10/2007 | Murakami et al. |
| 2008/0014916 | A1* | 1/2008 | Chen ..................... 455/422.1 |
| 2008/0153486 | A1 | 6/2008 | Ramkull et al. |
| 2008/0233955 | A1 | 9/2008 | Narang et al. |
| 2008/0293405 | A1 | 11/2008 | Meyer |
| 2010/0062764 | A1 | 3/2010 | Aiouaz et al. |
| 2010/0099405 | A1 | 4/2010 | Brisebois |
| 2011/0085498 | A1* | 4/2011 | Oba et al. ................ 370/328 |
| 2011/0117911 | A1* | 5/2011 | Narang et al. .......... 455/434 |
| 2011/0300865 | A1* | 12/2011 | Kashikar et al. ........ 455/435.2 |

FOREIGN PATENT DOCUMENTS

| | | |
|---|---|---|
| EP | 2037713 | 3/2009 |
| WO | 2011/009210 | 1/2011 |

OTHER PUBLICATIONS

International Search Report issued in corresponding International application No. PCT/EP2012/059582, mailing date Jul. 24, 2012.

* cited by examiner

*Primary Examiner* — Jinsong Hu
*Assistant Examiner* — Magdi Elhag
(74) *Attorney, Agent, or Firm* — Potomac Patent Group, PLLC (57) ABSTRACT

Systems and methods provide a method for accessing a radio-communication system. The method includes: selecting one of a plurality of access configurations, wherein each access configuration includes a plurality of software modules; executing the selected one of the plurality of access configurations on a processor of a user equipment (UE); determining a result of the execution of the selected one of the plurality of access configurations; and associating the result of the execution of the selected one of the plurality of access configurations with the selected one of the plurality of access configurations.

24 Claims, 7 Drawing Sheets

METHODS AND SYSTEMS FOR SELF-TUNING NETWORK SEARCH ALGORITHMS

TECHNICAL FIELD

The present invention relates generally to communication networks and more specifically to network access searching.

BACKGROUND

At its inception radio telephony was designed, and used for, voice communications. As the consumer electronics industry continued to mature, and the capabilities of processors increased, more devices became available for use that allowed the wireless transfer of data between devices. Also more applications became available that operated based on such transferred data. Of particular note are the Internet and local area networks (LANs). These two innovations allowed multiple users and multiple devices to communicate and exchange data between different devices and device types. With the advent of these devices and capabilities, users (both business and residential) found an increasing need to transmit data, as well as voice, from mobile locations.

The infrastructure and networks which support this voice and data transfer have likewise evolved. Limited data applications, such as text messaging, were introduced into the so-called "2G" systems, such as the Global System for Mobile (GSM) communications. Packet data over radio communication systems were implemented in GSM with the addition of the General Packet Radio Services (GPRS). 3G systems and, then, even higher bandwidth radio communications introduced by Universal Terrestrial Radio Access (UTRA) standards made applications like surfing the web more easily accessible to millions of users (and with more tolerable delay). Another radio access technology (RAT), Wideband Code Division Multiple Access (WCDMA) which is an improvement to the 2G systems, can also be found in use.

Even as new network designs are rolled out by network manufacturers, future systems which provide greater data throughputs to end user devices are under discussion and development. For example, the so-called 3GPP Long Term Evolution (LTE) standardization project is intended to provide a technical basis for radiocommunications in the decades to come. This evolution of network designs has resulted in various network operators deploying their networks in various frequency bands with different RATs in various geographical areas. As a result of this, a user equipment (UE) which supports several frequency bands and/or different RATs will need to be able to search for cells and service in a correct frequency band and/or RAT depending upon, for example, the geographical area in which the UE is currently located, the quality desired for a particular service and operator preferences.

One solution for supporting a multi-band and/or multi-RAT UE in various geographical areas involves implementing network search algorithms in the UE. However, the actual design process of these algorithms is time consuming. The designers of these algorithms have an ongoing need to have up to date information about the various deployed networks by the various network operators. Another issue exists for UEs that already are in the market place. Due to the static nature of the algorithms currently used, the network search algorithms already in these legacy UEs may become inefficient when the various network operators re-plan or modify their networks. Additionally, UEs currently can take a long time when executing the access searches which then leads to a considerable delay until a network is found as experienced by the user.

Accordingly, it would be desirable to provide methods and systems for multi-band, multi-RAT UEs which avoid or reduce the above described drawbacks.

SUMMARY

Exemplary embodiments describe methods and systems for accessing and obtaining information associated with various frequency bands and/or various radio access technologies (RATs) for multi-band and/or multi-RAT UEs. By using the exemplary embodiments, multi-band and/or multi-RAT UEs can more efficiently obtain service to a desired network.

According to an exemplary embodiment there is method for accessing a radiocommunication system. The method includes: selecting one of a plurality of access configurations, wherein each access configuration includes a plurality of software modules; executing the selected one of the plurality of access configurations on a processor of a user equipment (UE); determining a result of the execution of the selected one of the plurality of access configurations; and associating the result of the execution of the selected one of the plurality of access configurations with the selected one of the plurality of access configurations.

According to an exemplary embodiment the method can also include wherein the radiocommunication system includes a plurality of radio access technologies (RATs). Alternatively, the method can include wherein the radiocommunication system uses a single radio access technology (RAT) and a plurality of frequency bands. Additionally the method can include wherein the plurality of access configurations includes all possible permutations of the plurality of software modules. The method can also include executing all possible permutations of the plurality of software modules. The method can also include executing the subset of all possible permutations of the plurality of software modules. Additionally, the method can include wherein the selected one of the plurality of access configurations includes a first software module including instructions to perform a first received signal strength indicator scan (RSSI), a second software module including instructions to perform a second RSSI scan, and a third software module including instructions to perform a third RSSI scan. The method can also include wherein the processor executes the first, second and third software modules in order. The method can also include wherein an order of selecting a configuration for accessing the network is randomized.

According to another exemplary embodiment there is a processing system for accessing a radiocommunication system. The processing system includes: a software framework including a plurality of software modules, each of the software modules including program code which can be executed to perform a task associated with access to the radiocommunication system; wherein an access configuration includes one or more software modules to be executed in an order; a processor configured to use the software framework by selecting one of a plurality of access configurations; the processor configured to execute the selected one of the plurality of access configurations; the processor configured to determine the result of the execution of the selected one of the plurality of access configurations; and the processor configured to associate the result of the execution of the selected one of the plurality of access configurations with the selected one of the plurality of access configurations.

According to an exemplary embodiment the processing system can also include: a memory configured to store the plurality of software modules; the memory configured to store the result of the execution of the selected one of the plurality of access configurations; and the memory configured to store the association. The processing system can also include wherein the radiocommunication system includes a plurality of radio access technologies (RATs). The processing system can also include wherein the radio communication system uses a single RAT and a plurality of frequency bands. The processing system can also include wherein the plurality of access configurations includes all possible permutations of the plurality of software modules. The processing system can also include wherein all possible permutations of the plurality of software modules are executed.

According to exemplary embodiments the processing system can also include wherein the plurality of access configurations includes a subset of all possible permutations of the plurality of software modules. Additionally, the processing system can include wherein the subset of all possible permutations of the plurality of software modules is executed. The processing system can also include wherein the selected one of the plurality of access configurations includes a first software module including instructions to perform a first received signal strength indicator (RSSI) scan, a second software module including instructions to perform a second RSSI scan, and a third software module including instructions to perform a third RSSI scan. The processing system can also include wherein the processor executes the first, second and third software modules in order.

According to an exemplary embodiment there can be a terminal platform including the processing system and a communication device including the terminal platform.

According to an exemplary embodiment there is a non-transitory computer-readable medium containing instructions for accessing a radio communications system which, when executed on a processor, perform the steps of: selecting one of a plurality of access configurations, wherein each access configuration includes a plurality of software modules; executing the selected one of the plurality of access configurations on a processor of a user equipment (UE); determining a result of the execution of the selected one of the plurality of access configurations; and associating the result of the execution of the selected one of the plurality of access configurations with the selected one of the plurality of access configurations.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to exemplary embodiments, an algorithm (or algorithms) for performing a network search can be broken down into software components or modules and a software framework that is capable of running the software components in an order which can be defined by a certain access configuration. The network search can be a search for one or more radio access technologies (RATs) and/or frequency bands which may use a different architecture and air interface, e.g., Global System for Mobile (GSM) communications, Universal Terrestrial Radio Access (UTRA), Wideband Code Division Multiple Access (WCDMA), 3GPP Long Term Evolution (LTE) and the like. In some scenarios, e.g., for the purpose of learning, these software components can be randomly (or otherwise) combined by the user equipment (UE) and run by a controlling software, which can be a part of the software framework, in various scenarios, e.g., geographical environments. The results of the various combinations, also referred to herein as "configurations", can then be compared by the controlling software. According to exemplary embodiments, the combination that succeeds in finding coverage in the desired manner, e.g., fastest or according to any requirements, can be chosen as the primary access configuration to be run for that specific scenario for a subsequent search for a network.

Figure 1:
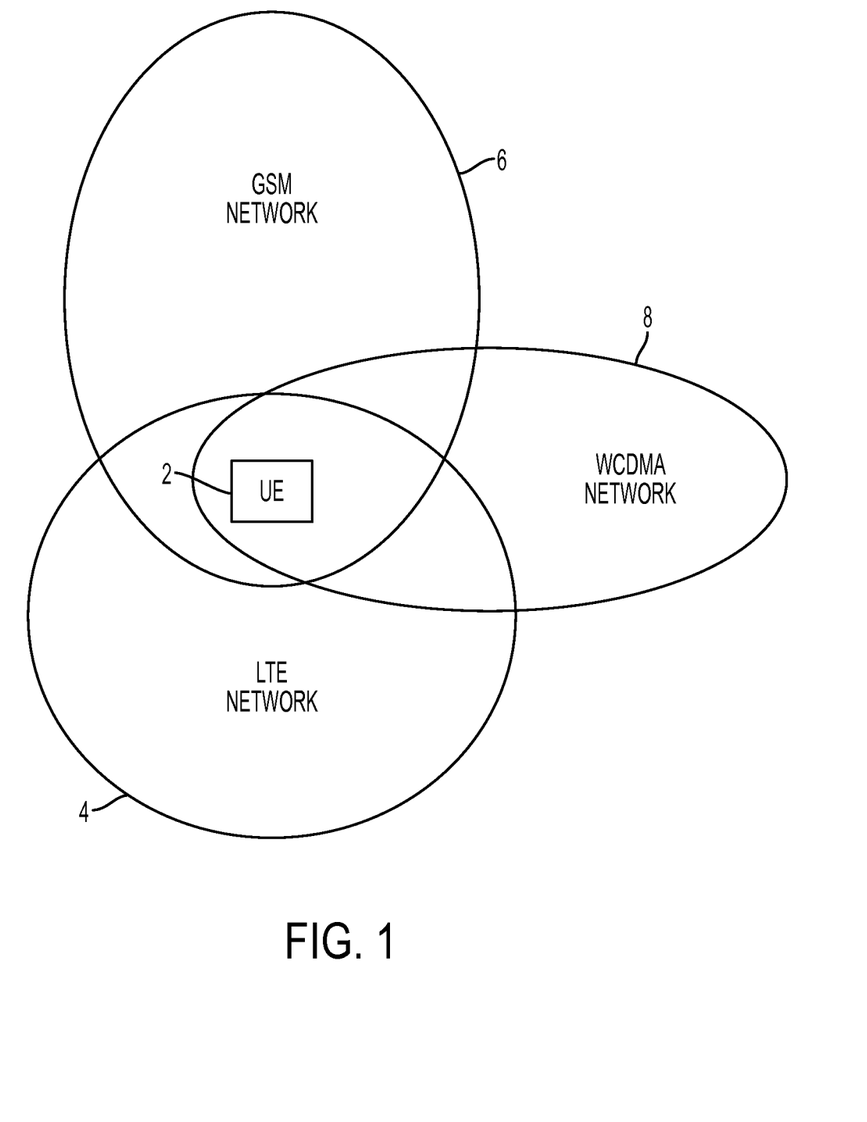
FIG. 1 illustrates a User Equipment (UE) which is within a coverage zone of three different radio access technology (RAT) networks according to an exemplary embodiment.

Prior to describing exemplary embodiments which can perform the multi-RAT search, an example of a UE in an area covered by multiple overlapping RATs (each RAT which may or may not have a plurality of frequency bands) is now described with respect to FIG. 1. FIG. 1 shows three RAT communication networks, e.g., LTE network 4, GSM network 6 and WCDMA network 8, and a UE 2. According to exemplary embodiments described below, the UE 2 can test one or more configurations to determine which is optimal for a given access scenario. As used herein, a "scenario" describes the conditions or parameters, including geographical area, the quality desired for a particular service and operator preferences, which may affect radiocommunication access options for the UE 2. Other parameters which can influence or define the scenario, as well as the best or desired access option for a UE 2, are described in more detail below. Additionally, while not shown, the UE 2 can be in a coverage location where there can be a plurality of the same RATs and/or different RATs which have different operators.

According to exemplary embodiments, as described above, a plurality of software components can be used by the UE 2 for identifying the desired connection to the desired network for a given access scenario. These software components can be put into various access configurations. The access configurations can be predetermined, or dynamically put together, and then executed either in some predetermined fashion, a partially predetermined fashion or in a completely random fashion. Some purely illustrative examples of access configurations are now described with respect to FIGS. 2-4.

Figure 2:
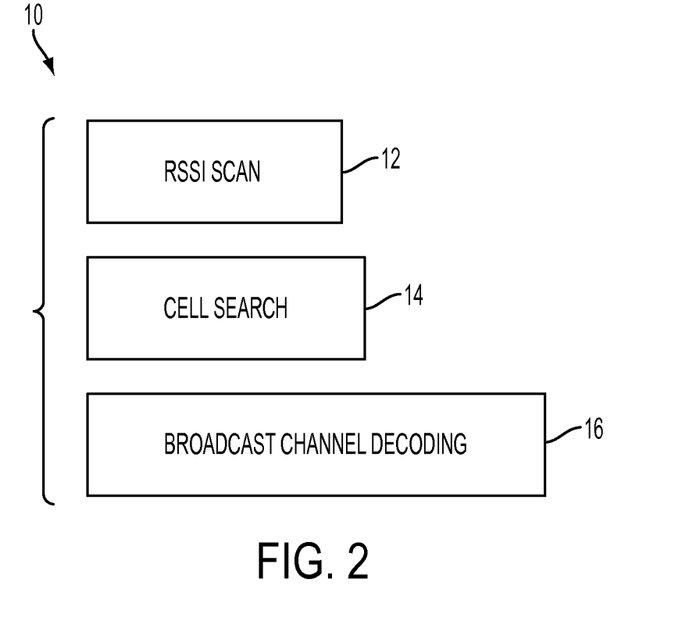
FIG. 2 shows an access configuration according to an exemplary embodiment.

According to an exemplary embodiment, one access configuration 10, as shown in FIG. 2, includes a Received Signal Strength Indication (RSSI) scan software component 12, a cell search software component 14 and a broadcast channel decoding software component 16. The RSSI scan software component 12 can measure the power of a received radio signal. Additionally, the RSSI scan can be for different frequency bands and/or for different RATs as well as being performed in any order. The cell search software component 14 can be a software component which explores a carrier frequency to determine whether an actual cell exists on the carrier or whether the measured energy is only noise. For example, in a WCDMA system, a cell search can correlate the measured signal with various scrambling codes to determine whether a match is found, i.e., whether a cell is found. For another example, in a GSM system, the cell search could decode the base station identification code (BSIC) to determine that the carrier is associated with an actual cell.

The broadcast channel decoding software component 16 can involve the reading of broadcast channels. For example, in the WCDMA system, the broadcast control channel (BCCH) logical channel is mapped on the broadcast channel (BCH) physical channel which can be read by the broadcast channel decoding software component 16. For another example, in an LTE system, the BCCH logical channel can be mapped onto the BCH physical channel and/or onto the downlink shared channel, which can then be read by the broadcast channel decoding software component 16 to determine the system information provided by the network operator. This system information can include which operator the cell belongs to and whether or not the current UE is able to camp on the cell with respect to location area, barred characteristics, etc. The software components or modules can be executed by a processor of the UE 2 in order from top to bottom as illustrated in FIG. 2.

According to an exemplary embodiment, the access configuration 10 shown in FIG. 2 can be used by a UE 2 which serves only a single RAT that has one or more frequency bands. For this embodiment, the UE 2 can only operate in (or knows that only one RAT is available) and performs the functions of the access configuration 10 over the one or more frequency bands of the single RAT.

Figure 3:
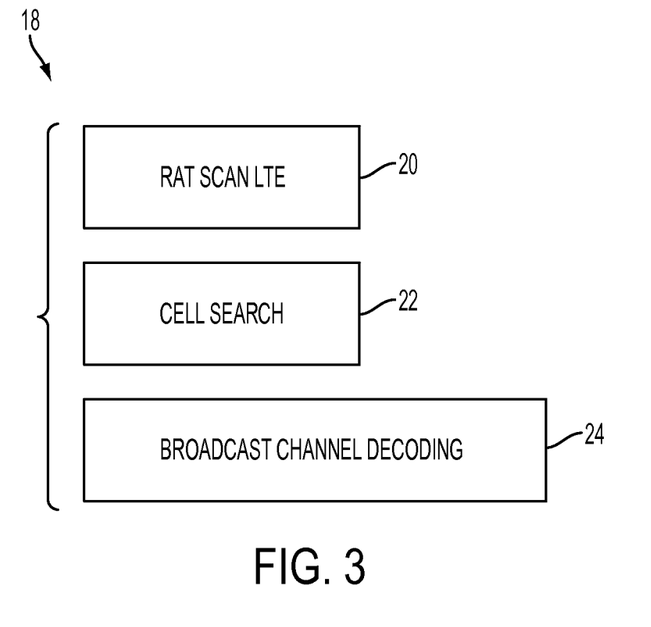
FIG. 3 shows another access configuration according to an exemplary embodiment.

According to exemplary embodiments, a second access configuration 18, as shown in FIG. 3, can include a so-called "RAT scan" LTE software component 20 a cell search software component 22 and a broadcast channel decoding software component 24. The RAT Scan LTE software component 20 can perform an RSSI scan of the LTE RAT, in one or more frequency bands as applicable and desired. The RAT scan LTE software component 20 can also include measuring the RSSI level of the carrier and determining probabilities for finding a cell on the carrier based, at least in part, on the measured RSSI level. The cell search software component 22 and the broadcast channel decoding software component 24 can perform their respective functions in manners similar to those described above with respect to the embodiment associated with FIG. 2.

Figure 4:
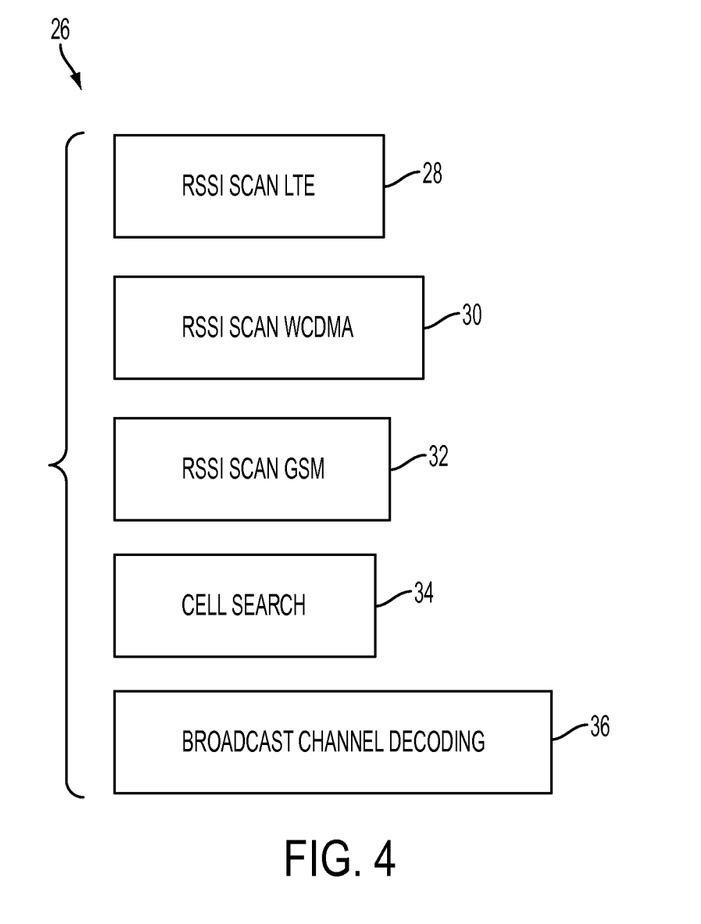
FIG. 4 shows yet another access configuration according to an exemplary embodiment.

According to another exemplary embodiment, a third access configuration 26, as shown in FIG. 4, can include an RSSI scan LTE software component 28 (which performs the RSSI scan for the LTE network 4) an RSSI scan WCDMA software component 30 (which performs the RSSI scan for the WCDMA network 8), an RSSI scan GSM software component 32 (which performs the RSSI scan for the GSM network 6), a cell search software component 34, and a broadcast channel decoding software component 36. While three access configurations are shown here, more access configurations with different software components can be used, e.g., the RSSI scans can be further broken down by various frequency bands within a specific architecture type.

According to exemplary embodiments, other configurations can vary the order in which the illustrated software components are executed by the UEs processor. For example, the cell search software component 14 can perform the cell search for all RATs and/or frequency bands. This cell search can be performed after all RSSI scans are completed, in any order, or the cell search can be performed as soon as the RSSI scan presents a result. For another example, the broadcast channel decoding software component 16 can perform the broadcast channel decoding after all of the cell searches have been completed or as soon as the cell search provides a result.

According to another exemplary embodiment, access configuration 10 as shown in FIG. 2 can be performed iteratively when the UE 2 is searching for multiple RATs and/or frequency bands. For example, access configuration 10 can be performed for all LTE RAT options, then performed for all WCDMA options and the performed for all GSM options. Alternatively, the access configuration 10 could be performed for any RAT order as desired.

According to another exemplary embodiment, an RSSI scan can be performed by the RSSI scan software component 12 iteratively for each RAT option prior to performing the cell search software component 14 and the broadcast channel decoding software component 16 for each RAT. Alternatively, a round robin approach for each of the various software components for the various RATs could be performed.

Thus, according to exemplary embodiments, a software framework which can include a control software can be implemented on a device, e.g., UE 2, for executing the various access configurations. The various access configurations can be executed in varying orders, e.g., the RSSI scan 12 can be configured to be run in a certain frequency band, or a part of a frequency band, or over several frequency bands of the various RATs before another software component, such as cell search 14, is executed.

According to exemplary embodiments, in addition to being able to execute the various access configurations and the software components, the software framework can be configured with one or more pre-configurations which can dictate, for various scenarios, in which order the access configurations and software components can be executed. That is a plurality of configurations such as those illustrated in FIGS. 2-4 can be stored in a UE 2's memory device, e.g., by software component/module identity and order of execution. For example, a pre-configuration for a certain scenario can include instructions for an execution order where a first access configuration is executed which has software components which first perform an RSSI scan for one LTE band, then execute the cell searcher on a probable frequency followed by a broadcast channel decoding to determine whether the cell is suited for the user's subscription. Once the frequencies of this LTE band have been searched, assuming in this case without success, the next LTE band can be tested in a same manner. This pre-configuration may then also execute access configurations for performing similar steps for a WCDMA and GSM scan. Alternatively, another pre-configuration could be used which dictates access configurations to be run which execute the software components in a round-robin fashion between the RATs.

According to another exemplary embodiment, instead of using pre-configurations, the software framework on the UE 2 can try out different combinations or permutations of access configurations (or create its own access configurations from the various software components available) to seek the best combination for a certain scenario. For this exemplary embodiment, the software blocks could be randomly combined. Alternatively, the combination of software modules may be performed and executed in a pseudo-random fashion bounded by an appropriate logical order, e.g., having one or more components that perform one or more RSSI scans execute prior to software modules which perform a cell search. Another rule which could, for example, be imposed on otherwise random combinations of such software modules to generate access configurations is to not allow a broadcast channel decoding module to be executed unless a cell search module has been executed on that frequency.

If an access configuration fails or is not optimal, e.g., does not find a cell, is not the fastest and/or the least expensive, for a certain scenario the access configuration can be ruled out for that scenario, e.g., the conditions or parameters, including geographical area, the quality desired for a particular service and operator preferences, which may affect radiocommunication access options for the UE 2. The UE 2 can store information associated with access configurations and scenarios such that the UE 2 does not randomize in a similar manner for a same scenario (or similar scenario if desired). Additionally, the fastest of the successful access configurations (or most successful based upon other desired parameters, e.g., cost factors) for a scenario may be saved for future use by the UE 2. This storing of information by the UE 2 can occur after one or more executions of an access configuration.

The above described exemplary embodiments can lead towards a so-called "self learning" of the UE 2. For example, the UE 2 can execute the software components in various orders, e.g., predetermined, fully randomized, or partially randomized, determine a result for each executed access configuration and then sort the results from the various executed access configurations into various strata, e.g., optimal, functional and not functional. This result can then be associated with each executed access configuration with the result and association being stored. The UE 2 can then learn from the results, e.g., learn which access configurations are optimal for the UE 2 possibly for various scenarios.

Figure 5:
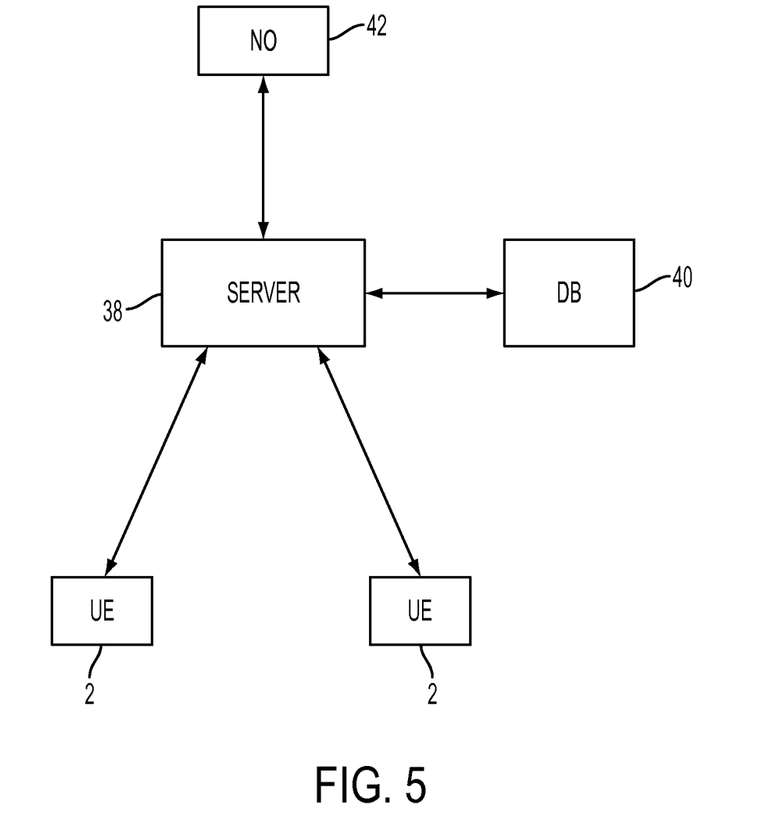
FIG. 5 shows a system for transmitting and storing data gathered by a UE according to an exemplary embodiment.

According to an exemplary embodiment, the UE 2 can be put into a test-mode to continuously carry out testing of various access configurations (randomly generated or not as desired) to gather data for different scenarios. As shown in FIG. 5, this gathered data can be transmitted by various UEs 2 to, for example, a server 38 which can be accessed by the software module designers, network operators 42 and others as desired. Additionally, this gathered data may be shared among UEs 2 in various manners, such as, uploading and/or downloading information from the server 38 as well as being stored in a database 40. According to another exemplary embodiment, the testing of various configurations can be performed only for certain scenarios, e.g., in a commercial product the testing process for access configurations could be carried out during an idle time during sleeping hours of the end user or when the UE 2 is connected to a charger in order to not waste battery power. The test mode can include selecting one of a plurality of access configuration, executing the selected access configuration, determining a performance level of the executed access configuration and storing information for the access configuration. These steps can be iterated in a loop as desired. Additionally, an access configuration may be run multiple times to verify success, failure or other desired criteria prior to saving that configuration as a preferred configuration for a certain scenario or removing it as an access configuration for a certain scenario. Alternatively, while shown in FIG. 5 as transmitting the information for the use of other UEs, the information gathered may be stored and used only locally, e.g., for a single UE 2 that performs the testing.

According to exemplary embodiments, UEs 2 may store information associated with the various access configurations and scenarios with successful combinations being stored in a database and associated with a specific subscriber identity module (SIM) card. If another SIM card is inserted into the UE 2, the database may be checked. If the algorithm has been previously run for this SIM card and an access configuration for the current scenario exists, the specific access configuration may be used. Otherwise, a default access configuration may be used until a more desirable access configuration has been found using exemplary embodiments described herein.

According to exemplary embodiments, as described above, the UE 2 can try different combinations of access configurations to seek out the best configuration for a certain scenario. One example of the most desirable access configuration can be, for example, the combination of software modules that results in the quickest network access for a given scenario. However, according to exemplary embodiments, other parameters can be used both for describing the scenario and for determining the best configuration for the associated scenario. For example, the speed of the UE 2 could be categorized into various categories, e.g., low speed, medium speed and high speed, with access configurations being evaluated and/or stored to support each associated scenario as desired. Other options that can be used in support of determining the best access configuration for a given scenario can include cost, e.g., looking for the cheapest rate, or to find the best coverage and signal strength, or other pre-stored options on a user's SIM card. For another criteria, the cell data traffic load could be used, or some combination of all of these options.

Figure 6:
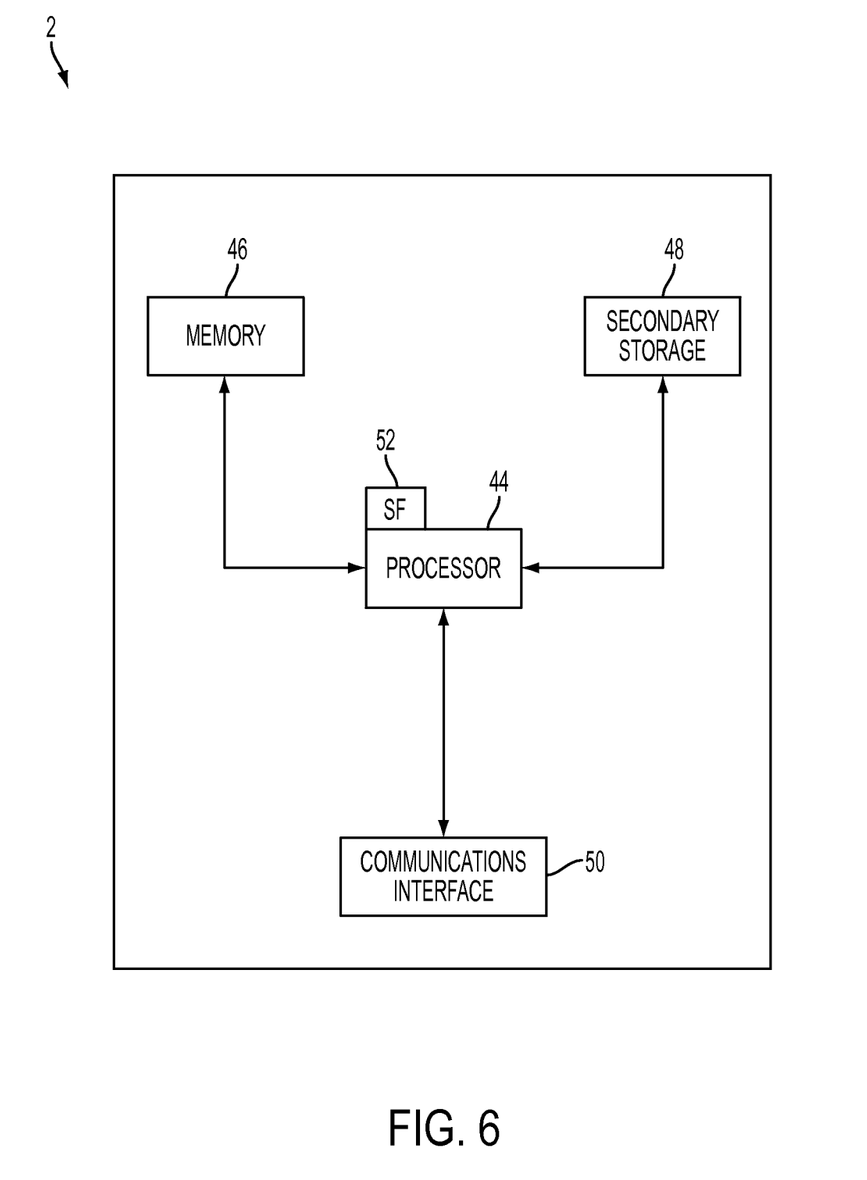
FIG. 6 depicts a device according to an exemplary embodiment.

The exemplary embodiments described above provide for executing a plurality of access configurations for a UE 2. An exemplary device, e.g., UE 2, will now be described with respect to FIG. 6. The UE 2 can contain a processor 44 (or multiple processor cores), memory 46, one or more secondary storage devices 48, an interface unit 50 to facilitate communications between the UE 2 and various RATs and/or frequency bands, and a software framework (SF) 52 for supporting the various access configurations. The processor 44 generally controls the various components of the UE 2. The processor 44 can execute instructions to facilitate the exemplary embodiments described, e.g., the processor 44 can execute instructions for implementing the various software components associated with an access configuration. Additionally, the processor 44 can sort the results of the various access configurations. Memory 46 can be used to store access configurations, as well as various information associated with the access configurations, e.g., previous success/failure information for an access configuration for a certain scenario and instructions associated with the order to execute access configurations. The interface unit 50 can include one or more transceivers configured to send and receive signals over various air interfaces associated with different RATs and/or frequency bands. Software framework 52 can include the control software and a framework for the software components to be executed in. Thus, UE 2 can perform the exemplary embodiments described herein.

Figure 7:
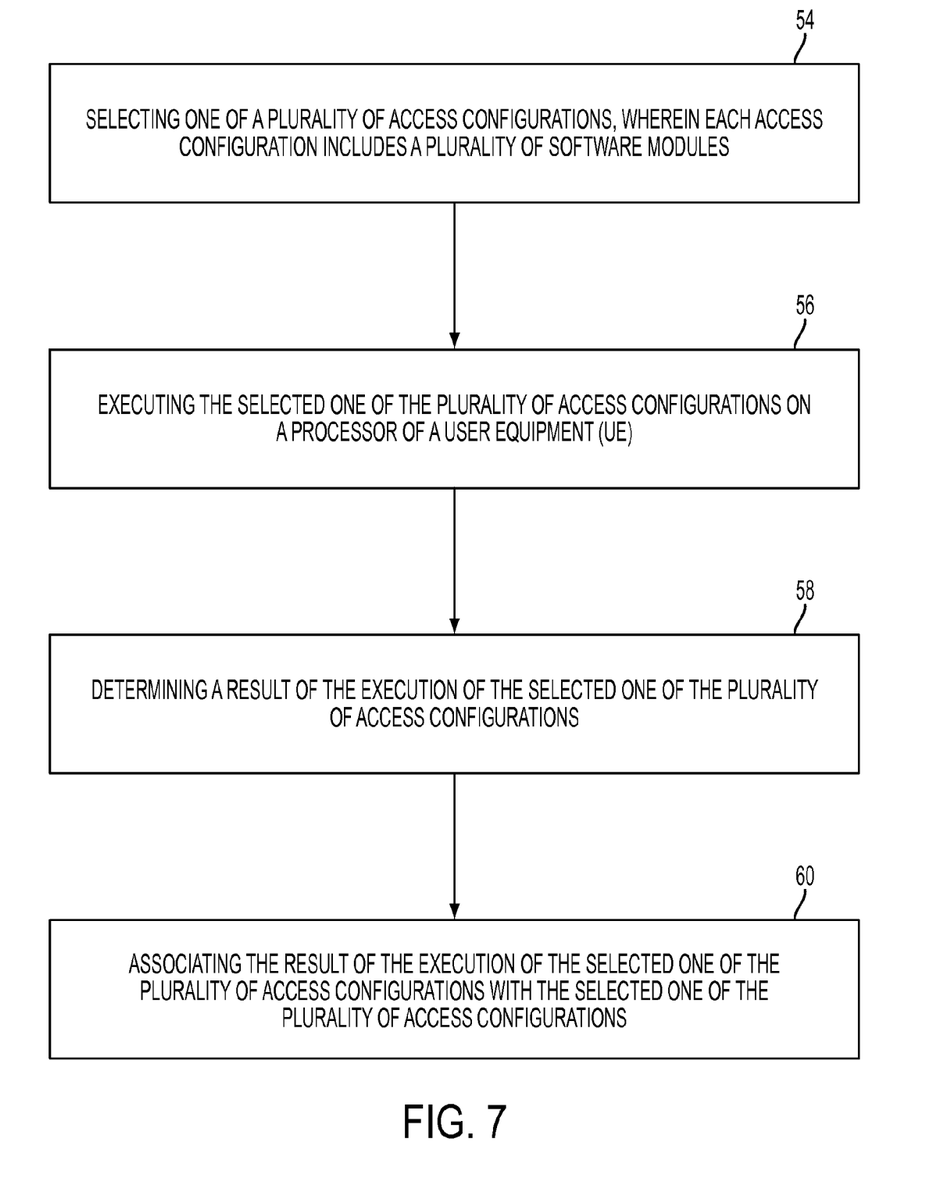
FIG. 7 is a flowchart illustrating a method according to exemplary embodiments.

An exemplary method for accessing one of a plurality of radiocommunication systems is illustrated in FIG. 7. Therein, at step 54 selecting one of a plurality of access configurations, wherein each access configuration includes a plurality of software modules; at step 56 executing the selected one of the plurality of access configurations on a processor of a user equipment (UE); at step 58 determining a result of the execution of the selected one of the plurality of access configurations; and at step 60 associating the result of the execution of the selected one of the plurality of access configurations with the selected one of the plurality of access configurations. Additionally, this method can be modified to include selecting an access configuration based on the results. In other words, after iterating the method at least twice, but possibly many more times, the access method that is selected, can be selected because of its results. The result criteria used for selection could be "best", which can be one of fastest connection, most reliable connection, or based on location data. Alternatively, if operating in a test mode, the access configuration selection could be random or based upon some optimizing algorithm.

The above-described exemplary embodiments are intended to be illustrative in all respects, rather than restrictive, of the present invention. Thus the present invention is capable of many variations in detailed implementation that can be derived from the description contained herein by a person skilled in the art. No element, act, or instruction used in the description of the present application should be construed as critical or essential to the invention unless explicitly described as such. Also, as used herein, the article "a" is intended to include one or more items.

What is claimed is:

1. A method for accessing a radiocommunication system, the method comprising:
   selecting one of a plurality of access configurations, wherein each access configuration includes a plurality of software modules;
   executing the selected one of the plurality of access configurations on a processor of a user equipment (UE);
   determining a result of the execution of the selected one of the plurality of access configurations; and associating the result of the execution of the selected one of the plurality of access configurations with the selected one of the plurality of access configurations,
   wherein the selected one of the plurality of access configurations includes a first software module including instructions to perform a received signal strength indictor (RSSI) scan, a second software module including instructions to perform a cell search, and a third software module including instructions to perform broadcast channel decoding.

2. The method of claim 1, wherein the radiocommunication system uses a plurality of radio access technologies (RATs).

3. The method of claim 1, wherein the radiocommunication system uses a single radio access technology (RAT) and a plurality of frequency bands.

4. The method of claim 1, wherein the plurality of access configurations includes all possible permutations of the plurality of software modules.

5. The method of claim 1, wherein the plurality of access configurations includes a subset of all possible permutations of the plurality of software modules.

6. The method of claim 1, wherein a first software module includes instructions to perform a first RSSI scan on a first RAT, a second software module includes instructions to perform a second RSSI scan on a second RAT and a third software module includes instructions to perform a third RSSI scan on a third RAT.

7. The method of claim 1, wherein a first software module includes instructions to perform a first RSSI scan on a first frequency band of a RAT, a second software module includes instructions to perform a second RSSI scan on a second frequency band of the RAT and a third software module includes instructions to perform a third RSSI scan on a third frequency band of the RAT.

8. The method of claim 1, wherein the step of determining further comprises:
   determining, as the result, whether execution of the selected one of the plurality of access configurations resulted in establishing a connection with the radio communication system.

9. The method of claim 1, wherein the step of determining further comprises:
   determining, as the result, a speed at which a connection to the radio communication system is established.

10. The method of claim 1, wherein the step of associating further comprises:
    storing information associated with the result for use in subsequent access attempts.

11. The method of claim 10, wherein previously selected access configurations which did not allow access to a network are not used by the device to access when the device is operating in an environment similar to the environment in which network access was not allowed.

12. The method of claim 1, wherein each of the plurality of software modules, when executed, perform a predetermined network access related function associated with a RAT, with the predetermined network access related function including at least an RSSI scan.

13. A processing system for accessing a radiocommunication system
comprising:
    a software framework including a plurality of software modules, each of the software modules including program code which can be executed to perform a task associated with access to the radiocommunication system;
    wherein an access configuration includes one or more software modules to be executed in an order;
    a processor configured to use the software framework by selecting one of a plurality of access configurations;
    the processor configured to execute the selected one of the plurality of access configurations;
    the processor configured to determine the result of the execution of the selected one of the plurality of access configurations; and
    the processor configured to associate the result of the execution of the selected one of the plurality of access configurations with the selected one of the plurality of access configurations,
    wherein the selected one of the plurality of access configurations includes a first software module including instructions to perform a received signal strength indictor (RSSI) scan, a second software module including instructions to perform a cell search, and a third software module including instructions to perform broadcast channel decoding.

14. The processing system of claim 13, further comprising:
    a memory configured to store the plurality of software modules;

the memory configured to store the result of the execution of the selected one of the plurality of access configurations; and the memory configured to store the association.

15. The processing system of claim 13, wherein a first software module includes instructions to perform a first RSSI scan on a first RAT, a second software module includes instructions to perform a second RSSI scan on a second RAT and a third software module includes instructions to perform a third RSSI scan on a third RAT.

16. The processing system of claim 13, wherein a first software module includes instructions to perform a first RSSI scan on a first frequency band of a RAT, the second software module includes instructions to perform a second RSSI scan on a second frequency band of the RAT and the third software module includes instructions to perform a third RSSI scan on a third frequency band of the RAT.

17. The processing system of claim 13, wherein the processor is configured to determine, as the result, whether execution of the selected one of the plurality of access configurations resulted in establishing a connection with the radio communication system.

18. The processing system of claim 13, wherein the processor is configured to determine, as the result, a speed at which a connection to the radio communication system is established.

19. The processing system of claim 14, wherein the memory is further configured to store information associated with the result for use in subsequent access attempts.

20. The processing system of claim 13, wherein access configurations which did not allow access to a network are not used by the device when the device is operating in an environment similar to the environment in which network access was not allowed.

21. The processing system of claim 13, wherein each of the plurality of software modules, when executed, perform a predetermined network access related function associated with the RAT, with the predetermined network access related function including at least one of an RSSI scan.

22. A terminal platform comprising the processing system of claim 13.

23. A communication device comprising the terminal platform of claim 22.

24. A non-transitory computer-readable medium containing instructions for accessing a radio communications system which, when executed on a processor, perform the steps of:

selecting one of a plurality of access configurations, wherein each access configuration includes a plurality of software modules;

executing the selected one of the plurality of access configurations on a processor of a user equipment (UE);

determining a result of the execution of the selected one of the plurality of access configurations; and associating the result of the execution of the selected one of the plurality of access configurations with the selected one of the plurality of access configurations, wherein the selected one of the plurality of access configurations includes a first software module including instructions to perform a received signal strength indictor (RSSI) scan, a second software module including instructions to perform a cell search, and a third software module including instructions to perform broadcast channel decoding.

\* \* \* \* \*